Aug. 4, 1925.
T. TODDINGS
1,548,178
VENTILATING APPARATUS
Filed Sept. 11, 1922    2 Sheets-Sheet 1
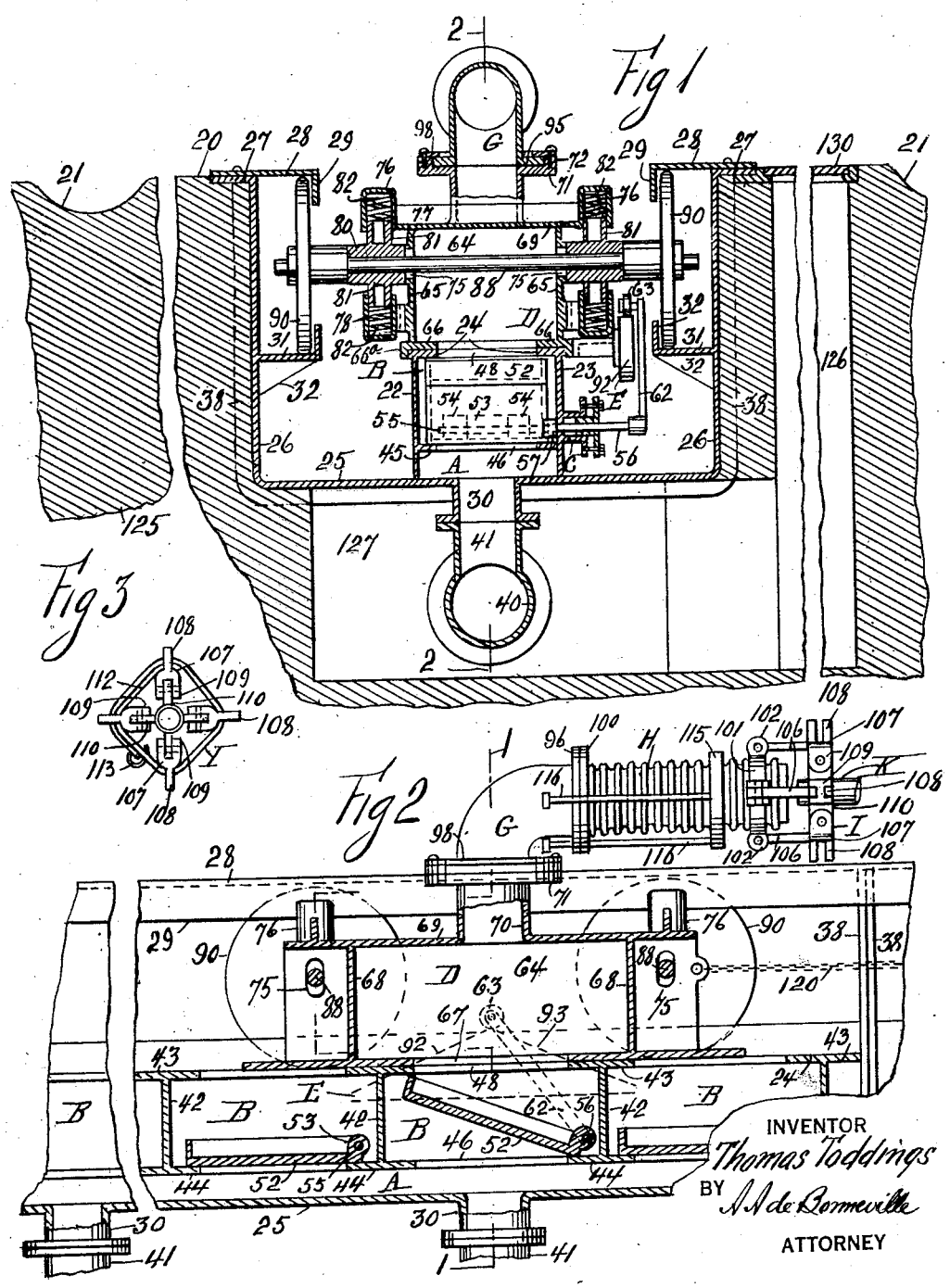
INVENTOR
Thomas Toddings
BY
A. A. de Bonneville
ATTORNEY

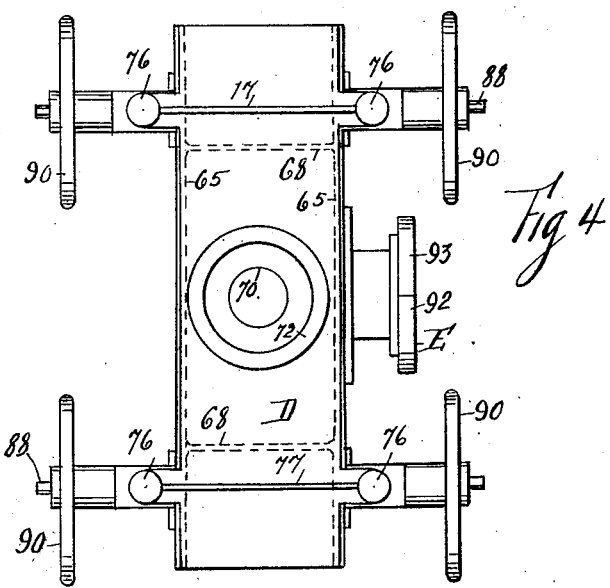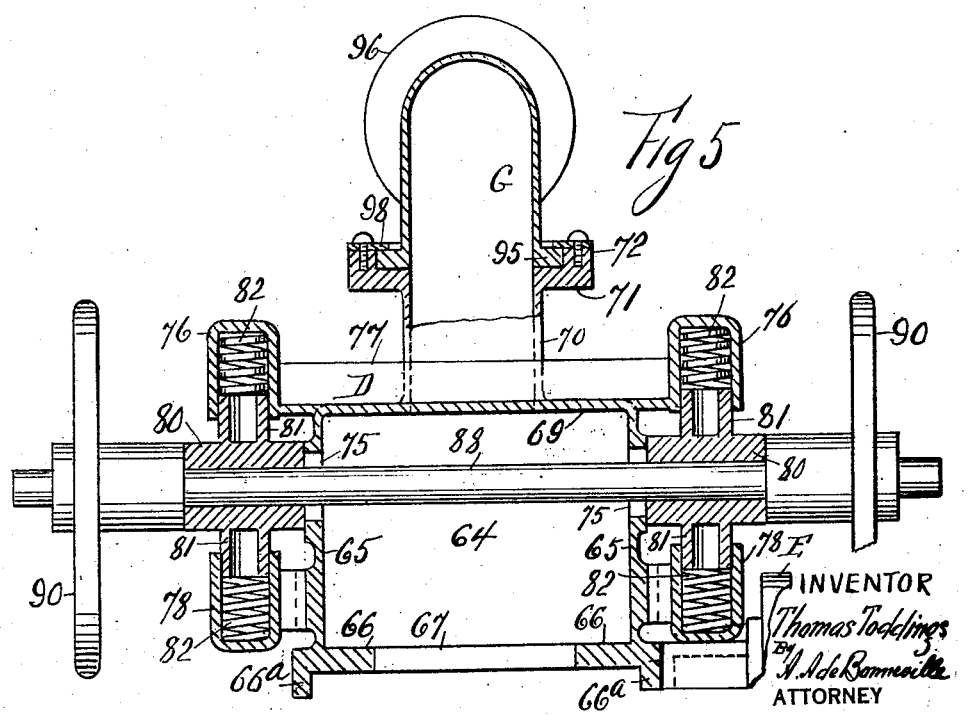

Patented Aug. 4, 1925.

1,548,178

UNITED STATES PATENT OFFICE.

THOMAS TODDINGS, OF BAYONNE, NEW JERSEY.

VENTILATING APPARATUS.

Application filed September 11, 1922. Serial No. 587,421.

*To all whom it may concern:*

Be it known that I, THOMAS TODDINGS, a citizen of the United States, and resident of Bayonne, in the county of Hudson and State of New Jersey, have invented certain new and useful Improvements in a Ventilating Apparatus, of which the following is a specification.

This invention relates to a ventilating apparatus. Its object is the production of apparatus by means of which the atmosphere of tunnels, subways and the like is prevented from contamination by the exhaust from motor vehicles. A second object of the invention is to ventilate tunnels and subways and to prevent the accumulation therein of noxious gases. The third object of the invention is to draw the exhaust from a motor driven vehicle as it moves through a tunnel or subway and discharge it outside of the tunnel or subway.

In the accompanying drawings Fig. 1 represents a cross-section as on the broken line I, I, of Fig. 2, of an exemplification of the ventilating apparatus; Fig. 2 shows a partial side view and section of Fig. 1 on the line 2, 2: Fig. 3 indicates the end view of a detail; Fig. 4 is a partial top plan view of Fig. 1 and Fig. 5 is an enlarged view of a portion of Fig. 1.

The floor of a tunnel is indicated at 20 with longitudinal depressions 21 for the wheels of a motor vehicle, not shown. An exhaust duct is indicated in its entirety by the letter A, and comprises the inner side walls 22, 23 with the upper longitudinal flanges 24, that constitute tracks. The bottom wall 25 of the duct extends beyond the said side walls and connects with the outer side walls 26, which latter have formed therewith the upper flanges 27. Wheel guards 28 with the depending flanges 29 are fastened to the flanges 27. Branch outlet pipes 30 extend from the duct A. A shelf 31 with the flange 32 extends from each wall 26. The walls 26 are made in sections with the abutting flanges 38 that are bolted to each other. An exhaust pipe 40 is located, in this instance, under the duct A and has extending therefrom branch pipes 41, that are detachably connected to the branch pipes 30.

A plurality of valve chambers B are formed in the duct A, and comprise the cross walls 42 with the upper cross flanges 43, the lower cross flanges 44 and the bottom walls 45. Lower valve ports 46 are formed with the bottom flanges 44 and the bottom walls 45, and upper valve ports 48 are formed with the cross flanges 43 and the flanges 24.

A valve 52 is located in each of the valve chambers B. A hinge member 53 is formed with each valve 52, and a pair of hinge members 54 are formed with one of the flanges 44. A hinge pin 55 extends through said hinge members. A stuffing box C is formed in the wall 23 for each of the valve chambers B. A spindle 56 extends through each stuffing box C and one end thereof is fastened to the hinge pin 55, by means of the coupling 57. An arm 62 has one end fastened to the spindle 56 and to its other end is journaled a roller 63.

A trolley is designated in its entirety by the letter D. The trolley comprises the chamber 64 with the side walls 65 having the horizontal flanges 66 and the depending flanges 66ª. The flanges 66 bear on the tracks 24 and have formed therein the port 67. End walls for the trolley are indicated at 68, which latter join with the roof 69. An inlet pipe 70 with the flange 71 is formed with the roof 69. The flange 71 has extending therefrom the annular flange 72. The walls 65 extend beyond the end walls 68 and have formed therein the elongated openings 75. Spring seats 76 extend from the roof 69 and are connected by the rib 77 which joins with said roof. Detachable spring seats 78 are coaxial with the spring seats 76 and are fastened to the walls 65 of the trolley. Axle bearings 80 have extending therefrom the guide plugs 81 which are guided in the spring seats 76 and 78.

Springs 82 are located in the said spring seats and bear against the guide plugs 81. Axles 88 are journaled in the bearings 80 and have fastened to their ends the wheels 90, which will roll on the shelves 31, and are covered by the wheel guards 28. A cam E is fastened to one side of the trolley D, and has formed therewith the inclined upper walls 92 and 93, which are in line with the rollers 63.

An elbow G is shown with the horizontal lower flange 95 and the vertical flange 96. The flange 95 bears on the flange 71. A plate ring 98 is fastened to the flange 72 and engages the flange 95, to enable the latter to swing.

A corrugated intake pipe is indicated in its entirety by the letter H and at one end thereof is fastened the flange 100, which is bolted to the flange 96 and adjacent to its other end is fastened a ring 101 with a plurality of pairs of eyelets 102.

A clamping device is designated in its entirety by the letter I. The clamping device comprises a plurality of arms 106 which at one end are hinged to the pairs of eyelets 102. The arms 106 have extending from their other ends the members 107, which latter at their top ends have formed therewith the forks 108 and at their lower ends are formed the jaws 109. Grippers 110 are hinged to the jaws 109. A chain 112 has one end thereof fastened to one of the members 107 and then extends through the forks 108. A hook 113 is fastened to the other end of the chain 112.

A U shaped support 115 has extending therefrom the rods 116 which are slidably supported in the flanges 96 and 100. The support 115 is provided for the pipe H.

Chains 120 have one end each fastened to the walls 65 of the trolley D and their other ends are fastened to the vehicle which runs through the tunnel. The exhaust pipe of the vehicle is indicated at K.

The apparatus is indicated as located below the floor level 20 of the tunnel and in the concrete foundation 125 thereof. At a predetermined distance a shaft 126 is formed in the concrete which connects with a longitudinal chamber 127 below the wall 25. A detachable cover 130 is provided for the shaft 125 and thereby means are provided to inspect the pipe 40 and make any necessary repairs thereto.

Various modifications may be made in the invention and the present exemplification is to be taken as illustrative and not limitative thereof.

To operate the apparatus the clamping device I is fastened to the exhaust pipe K by locating the grippers 110 on the pipe and tightening the chain 112 so that the said grippers tightly clamp the said pipe. The chains 120 are fastened to the vehicle which is to run through the tunnel. When the vehicle moves the trolley D will move therewith, the wheels 90 rolling on the shelves 31. An exhausting apparatus, not shown, is connected to the pipe 40. When the trolley D moves the rollers 63 will engage the cam E and while it moves over each valve chamber B the valve 52 will be opened and closed. Before the trolley D uncovers the port 48 of one valve chamber its port 67 is in connection with the port 48 of the next adjacent valve chamber. The exhaust from the vehicle enters the valve chamber B and is drawn into exhaust pipe 40 and then discharged from the latter. The gases left in each chamber B after its valve 52 closes is drawn into the next adjacent valve chamber B as the trolley D moves.

If desired any of the valves 52 may be opened to ventilate the tunnel without employing the trolley D. While the trolley moves through the tunnel the suction in the valve chambers B tends to draw the trolley D to the tracks 24, so that the leakage between said track and the flanges 66 is reduced to a minimum.

Having described my invention what I desire to secure by Letters Patent and claim is:

1. In an apparatus of the character described the combination of an exhaust duct having a track formed on its upper face, a trolley adapted to move over the duct and having a flange in sliding contact with said track, a chamber in the trolley, a pipe swiveled to the roof of the chamber with its interior in communication with said chamber, means to detachably connect said pipe to the exhaust pipe of a vehicle, means to connect the trolley to said vehicle, chambers formed with the duct, valves in said chambers and means to open said valves as the trolley moves over the duct.

2. In an apparatus of the character described the combination of an exhaust duct having a track formed on its upper face and having vertical spaced outside walls, shelves on said walls, a trolley, a chamber in the trolley having flanges on its lower face in sliding contact with said tracks, axles for the trolley, wheels fastened to the axles adapted to roll on said shelves, bearings for the axles, springs supporting said bearings, a pipe extending from the roof of the chamber with its interior connected thereto, means to detachably connect said pipe to the exhaust pipe of a vehicle, means to detachably connect the trolley to said vehicle, chambers having ports formed with the duct, valves in the chambers and means to open said valves as the trolley moves over the duct.

3. In an apparatus of the character described the combination of an exhaust duct having tracks formed therewith, said duct having a plurality of ports in its roof, a trolley over the duct with its lower face bearing on said tracks, a chamber in the trolley, chambers in the duct for each of its ports, a valve in each latter chamber cooperating with a second port therein, a cam carried on the trolley, an arm for each valve with one end connected thereto, and the other end of each adapted to contact with said cam to open said valves, a pipe extending from the chamber of the trolley and detachable means to connect said pipe to the exhaust pipe of a vehicle.

4. In an apparatus of the character described the combination of an exhaust duct having tracks formed therein, said duct having a plurality of ports in its roof, a trolley having a chamber in sliding contact with said tracks, said duct having a chamber formed therein for each of its ports, each of said chambers having bottom walls and a port formed therein, a valve hinged in each chamber over its bottom port, a triangular shaped cam carried on the trolley, an arm with one end connected to each valve, a roller journaled in the swinging end of each arm, said roller adapted to be in the path of said cam to actuate the valves when the trolley moves over the duct, a pipe extending from the chamber of the trolley and detachable means to connect said pipe to the exhaust pipe of a vehicle.

5. In an apparatus of the character described the combination of an exhaust duct, having a plurality of ports formed in its roof, a trolley having a chamber in sliding contact with the roof of the duct, a chamber in said duct for each of its ports, a port formed in the bottom wall of each chamber, a valve hinged over each of the latter ports, means to raise each of said valves as the trolley moves over the duct, a pipe extending from the trolley in connection with the chamber thereof, a ring connected to said pipe, arms hinged to the ring, members hinged to the arms, said members having each forks at one end and a gripper on the other end, and a chain with one end fastened to one of said members and extending through the forks of the members, said grippers adapted to be clamped to the exhaust pipe of a motor vehicle, by tightening said chain to draw the grippers to said exhaust pipe, whereby the exhaust pipe is operatively connected to the trolley pipe.

6. In an apparatus of the character described the combination of a duct having a bottom wall and consisting of sections bolted together, a plurality of chambers formed in the duct, a port in the roof of each chamber and a port in the bottom wall of each chamber, branch pipes extending from the duct, an exhaust pipe connected to said branch pipes, a valve hinged in each chamber over its bottom port, side walls outside of the duct extending from the bottom wall thereof, a shelf extending from each of the latter walls and wheel guards above said shelves, a trolley in sliding contact with the roof of said duct, wheels for the trolley rolling on said shelves below said wheel guards, a hinge pin for each valve, an arm in connection with each hinge pin, a cam carried on the trolley causing said arms to swing when moving over the duct and opening said valves, a pipe extending from the roof of the trolley, means to detachably clamp said pipe to the exhaust pipe of a motor vehicle and means to detachably clamp the trolley to the vehicle.

Signed at the borough of Manhattan, city of New York, in the county of New York and State of New York, this 26th day of August, A. D. 1922.

THOMAS TODDINGS.